(No Model.)
W. P. KOOKOGEY.
SYSTEM FOR CHARGING AND DISCHARGING STORAGE BATTERIES.
No. 406,354. Patented July 2, 1889.
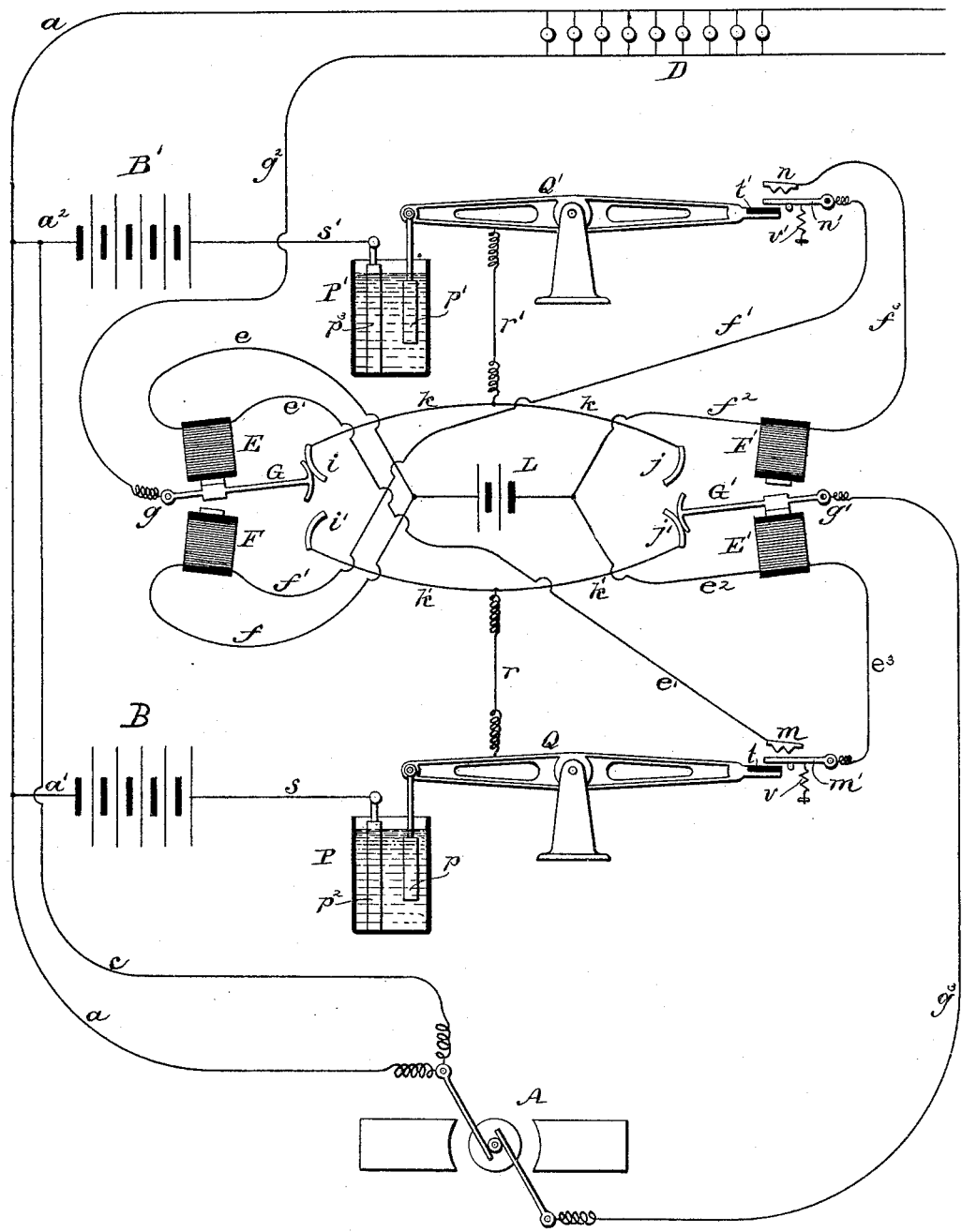
WITNESSES:
Walter S. Logan
M. Keating.
INVENTOR:
William P. Kookogey
BY
his ATTORNEYS.

UNITED STATES PATENT OFFICE.

WILLIAM P. KOOKOGEY, OF BROOKLYN, NEW YORK, ASSIGNOR TO THE KOOKOGEY ELECTRIC COMPANY.

SYSTEM FOR CHARGING AND DISCHARGING STORAGE-BATTERIES.

SPECIFICATION forming part of Letters Patent No. 406,354, dated July 2, 1889.

Application filed August 25, 1888. Serial No. 283,769. (No model.)

*To all whom it may concern:*

Be it known that I, WILLIAM PRESCOTT KOOKOGEY, of the city of Brooklyn, county of Kings, and State of New York, have invented a new and useful System for the Charge and Discharge of Storage-Batteries, of which the following is a specification.

My invention relates to means for connecting two sets of storage-cells alternately with a charging-source and with the working line or circuit which they are to supply with electricity; and its object is to supply means by which each battery may be charging while the other is discharging, and by which they may alternate with each other in these respective positions, each battery while charging being wholly disconnected from the working-line, and while discharging being wholly disconnected from the charging-line.

In the accompanying drawing, A represents the charging-source; B B', the two storage-batteries, and D the working-circuit. The principle is that the current from the discharging-battery operates automatically at the proper time to close a local circuit and energize electro-magnets, which thereupon operate switch-connections in the main circuits.

L is the local battery in circuit with the magnets E F E' F'. These magnets operate upon armatures fixed upon the levers G and G', which are pivoted respectively at $g$ $g'$. The levers G G' by alternate contact with the stationary contact-pieces $i$ $i'$ and $j$ $j'$ serve to alternately connect the storage-batteries B and B' with the charging-source A and the working-line D. A wire $k$ connects the contact-pieces $i$ and $j$, and a wire $k'$ connects the contact-pieces $i'$ and $j'$. The levers G G', by friction upon their pivots or otherwise, are made to remain in the respective positions in which the magnets E F E' F' leave them. This is necessary, as the currents through the magnets are not continuous. A wire $a$ leads from the charging-source A to the working-line D, and has connections $a'$ and $a^2$ with the batteries B and B'. The wire $c$ forms a second connection between the charging-source A and the battery B'. The wire $g^2$ connects the lever G with the working-line D, and the wire $g^3$ connects the lever G' with the charging-source A.

There are two distinct circuits through the magnets and the local battery L, one through the magnets E E', which are thus in series with each other, and the other through the magnets F F', which are thus in series with each other. The magnet E is connected with the local battery L by the wire $e$ and with a stationary contact-piece $m$ by the wire $e'$, and the magnet E' is connected with the local battery L by a wire $e^2$ and with the contact-lever $m'$ by a wire $e^3$. In like manner the magnet F is connected with the local battery L by a wire $f$ and with a contact-lever $n'$ by the wire $f'$, and the magnet F' is connected with the local battery L by a wire $f^2$ and with a stationary contact-piece $n$ by the wire $f^3$. The four magnets normally remain unenergized, but the magnets E E' are energized when the lever $m'$ is brought in contact with the piece $m$, and the magnets F F' are energized when the lever $n'$ is brought in contact with the piece $n$.

The alternation of the batteries is not only automatic, but at just the times when it should be made for the best results. It consists of the use of electro-depositing cells, which, when a certain amount of discharging-current has passed through them, operate to close the local circuits. Depositing-cells P P' are connected, respectively, with the batteries B B', and form a part of the electric circuit during both the charge and discharge of the battery, each having one of its plates or electrodes $p$ $p'$ suspended from one arm of a balance-beam Q Q', the opposite arm of which closes the circuits of the magnets by pressing the levers $m'$ $n'$ against contacts $m$ $n$ whenever the plates $p$ $p'$ descend. The electric current passing through the cells P P' in one direction during the charge and in the other during the discharge of the respective batteries alternately deposits metal upon the plates $p$ $p'$ and removes it from them, and they are so balanced upon the beams Q Q' as to descend when a certain predetermined amount of metal has been deposited upon them, or, in other words, when the discharge is complete. Wires $r$ $r'$ connect the balance-arms Q Q' to the wires $k$ $k$, and wires S S' connect the stationary plates $p^2$ $p^3$ of the cells P P' with the batteries B B'. The ends $t$ $t'$ of the balance-beams should be insulated. The coiled springs $v$ $v'$ return the levers $m'$ $n'$ to their former positions when the plates $p$ $p'$ again rise, which will be very soon after the current is established in the depositing-cells in the opposite direction.

The operation is as follows: In the drawing the apparatus is shown in position to charge the battery B from the generator A and to discharge the battery B' along the line D. The currents flow as follows: The charging-current from generator A, through wires $a$ and $a'$, battery B, wire S, cell P, balance-arm Q, wires $r$ and $k'$, contact $j'$, lever G', and wire $g^3$ back to generator A; the discharging-current from battery B', through wires $a^2$ and $a$, working-line D, wire $g^2$, lever G, contact $i$, wires $k$ and $r'$, balance-arm Q', cell P', and wire $s'$, back to battery B'. If, now, the circuit through the magnets F and F' be closed, they are energized from the local battery L, and they simultaneously attract the levers G G', thereby breaking the contact with the pieces $i$ and $j'$ and making contact with $i'$ and $j$, respectively. The effect of this is to cut off the battery B from the generator A and connect it with the working-line D, and to cut off the battery B' from the working-line D, and connect it with the generator A. While battery B' is discharging (the position of the drawing) metal is being deposited upon the plate $p'$. When it acquires a certain weight, it descends by gravity, carrying the end $t'$ up, and making contact between lever $n'$ and contact $n$. During the charge which thereupon ensues the metal is taken from the plate $p'$, and it soon rises. An analogous operation takes place in the cell P, which operates to change the apparatus back to the first position, when a certain amount of discharge from the battery B has taken place. Thus the working-line is always in connection with one or other of the batteries, one of them taking it up as soon as the other is exhausted to a certain point, and this point may be put at any desired degree of exhaustion by proper arrangement of the balance.

For the sake of simplicity in the drawing, the entire current is shown as passing through the depositing-cells P and P'. It would be possible, instead of the local battery L, to use a shunt from the generator A or from one or both of the batteries B B', in order to energize the magnets E E' F F'; but a separate local source of energy is the better way.

I claim as my invention—

1. The combination of a charging-circuit, two storage-batteries, a working-circuit, two electro-depositing cells, each respectively forming a part of both the charging and discharging circuits of one of the storage-batteries, and each of such depositing-cells having one of its plates suspended from the arm of a balance-beam so as to move up or down under the operation of the current through the cell, and a double alternating switch operated alternately by the movement of the balance-arms by which the storage-batteries, automatically and alternately with each other, are connected in circuit alternately with the working-line and with the charging-source, the one to charge while the other is discharging, substantially as and for the purpose described.

2. The combination of a charging-circuit, two storage-batteries, a working-circuit, two electro-depositing cells, each respectively forming a part of both the charging and discharging circuits of one of the storage-batteries and each of such depositing-cells having one of its plates suspended from the arm of a balance-beam so as to move up and down under the operation of the current through the cell, two local circuits with electro-magnets in them, which circuits when closed operate switch-connections in the battery-circuits to alternately and alternately with each other change them from connection with the working-circuit to connection with the charging-source, and circuit closers and breakers in the local circuits automatically operated by the balance-arms of the respective depositing-cells, substantially as and for the purpose described.

In witness whereof I have hereunto put my hand this 21st day of August, 1888, in the presence of two witnesses.

WM. P. KOOKOGEY.

Witnesses:
SALTER S. CLARK,
M. KEATING.